United States Patent Office 3,503,969
Patented Mar. 31, 1970

3,503,969
TETRAMERS OF SUBSTITUTED ARYLISOCYANATES
Allen John Wysocki, Norridge, Ill., assignor to Armour-Dial, Inc., Chicago, Ill., a corporation of Delaware
No Drawing. Continuation-in-part of application Ser. No. 634,845, May 1, 1967. This application Jan. 15, 1969, Ser. No. 791,493
Int. Cl. C07d *85/04;* A61k *27/00;* C11d *9/50*
U.S. Cl. 260—249.5                                           6 Claims

ABSTRACT OF THE DISCLOSURE

Tetramers of substituted arylisocyanates, particularly exemplified by the tetramer of N-(3,4-dichlorophenyl)-isocyanate. The compounds are of the class of polymers of isocyanate and are useful as bacteriostatic agents.

---

This application is a continuation-in-part of my copending application Ser. No. 634,845, filed on May 1, 1967, and now abandoned.

This invention relates to novel arylisocyanate polymer compositions, and more particularly, to new and useful substituted arylisocyanate tetramers.

U.S. Patent 2,838,511 to Kogon and British Patent 837,120 to Tate et al. teach the reaction of phenyl isocyanate or substituted phenylisocyanate in the presence of a catalytic quantity of a basic substance, such as a tertiary amine, to produce triaryl isocyanates having the structure:

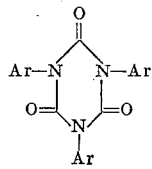

wherein Ar is an aryl radical of the benzene or naphthalene series. These trimers are biologically inactive. In U.S. Patent 3,259,626 to Muller et al., there is a mention of a particular isocyanate trimer; N,N',N"-tris-(6-chlorohexyl)-isocyanurate; as having fungistatic and bacteriostatic activity.

The present invention is based in part on the discovery that when certain substituted arylisocyanates are heated in the presence of catalytic amounts of an alcohol and a tertiary amine, tetramers of the substituted arylisocyanates are formed. These compounds have bacteriostatic activity, and such tetramers also exhibit synergistic bacteriostatic activity with a number of other germicides.

Therefore, it is an object of the present invention to provide new compositions of matter, said compositions being tetramers of substituted arylisocyanates having bacteriostatic activity. A further object is to provide tetramers of substituted arylisocyanates which exhibit synergistic activity with a number of other germicides. Other objects and advantages of this invention will become apparent from the ensuing description and examples.

The new compounds of this invention may be represented by the general formula:

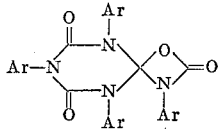

wherein Ar is a substituted phenyl radical, such as 3-chlorophenyl, 4-chlorophenyl, 5-chlorophenyl, 3,4-dichlorophenyl, 2,5 - dichlorophenyl, 3,4,5 - tri - chlorophenyl, 3-bromophenyl, 4-bromophenyl, 3,4-dibromophenyl 3-trifluoromethylphenyl, 4-trifluoromethylphenyl,, 4-chloro-3-trifluoromethylphenyl, 4-nitrophenyl, anisyl, naphthyl, and the like.

Exemplary of the new compounds and the preparation thereof are the following:

EXAMPLE I

N-(3,4-dichlorophenyl)-isocyanate tetramer

To a suitable reaction vessel, such as a one liter flask, optionally provided with agitation means and a source of heat, is added 188 grams (1 mole) of N-(3,4-dichlorophenyl)-isocyanate, 1½ ml. of ethyl alcohol and 3½ ml. of N-methylmorpholine. The mixture is heated to between 130 to 140° C. or until an exothermic reaction occurs and there maintained for about one hour or until the mixture solidifies. The reaction mass is then allowed to cool slowly to room temperature, filtered, washed with ethyl ether and air dried. The dried product, the N-(3,4-dichlorophenyl)-isocyanate tetramer, weighed 168 grams (90% yield) and had a melting point of 273 to 274° C. upon recrystallization from acetone-water.

EXAMPLE II

N-(4-chlorophenyl)-isocyanate tetramer

In like manner (as in Example I), 154 grams (1 mole) of N-(4-chlorophenyl)-isocyanate, 3½ ml. of N-methylmorpholine and 7 ml. of ethyl alcohol can be reacted at 170° C. for about 1½ hours, or until the mixture solidifies. The tetramer product is obtained in a yield of 93 grams (60% yield) and has a melting point of 331–334° C.

EXAMPLE III

N-(3-chlorophenyl)-isocyanate tetramer 77 grams (½ mole) of N-(3-chlorophenyl)-isocyanate can be reacted in the same manner as in Example II to obtain 44 grams (57% yield) of the tetramer which has a melting point of 224–225° C.

EXAMPLE IV

N-(2,5-dichlorophenyl)-isocyanate tetramer

A suitable reaction vessel, such as described in previous examples, is charged with 188 grams (1 mole) of N-(2,5-dichlorophenyl)-isocyanate, and treated with 7 ml. of ethyl alcohol and 3½ ml. of N-methylmorpholine. The mixture is heated to about 170° C. for about 1½ hours, cooled, filtered, and washed with ethyl ether. 124 grams (66% yield) of the tetramer is obtained, which has a melting point of 285–288° C.

In the hereinabove examples, ebullioscopic measurements of molecular weight were used to determine that the tetramer had been formed.

One way by which the compounds of this invention may be made is as follows: a substituted arylisocyanate is heated to a temperature at which the reaction becomes exothermic, and there maintained in the presence of catalytic amounts of an alcohol and a tertiary amine, for a period of time sufficient to precipitate the tetrameric product from the reaction mixture. It appears that when the arylisocyanate reactant constitutes certain of the substituted phenylisocyanates, the reaction stops with the formation and precipitation of the tetramer due to insolubility in the reaction medium. Using this method, the tetramer does not appear to precipitate out of the reaction mixture when the arylisocyanate reactant is unsubstituted phenylisocyanate or othro-chlorophenyl isocyanate due to the greater solubility of substituted and mono-ortho-substituted materials. The tetramer may be obtained when 2,5-dichlorophenyl isocyanate is used as the reactant due to the decreased solubility caused by the second chlorine atom. This is an instance where the tetramer is obtained from an ortho-substituted phenylisocyanate.

In this preparation of the compounds, the arylisocyanate reactant should be substituted. Phenylisocyanate generally yields the trimer, whereas a mono-substituted arylisocyanate such as meta-chlorophenyl isocyanate yields the desired tetramer. Any substitution material which does not react with isocyanate and which forms therewith a relatively insoluble compound such as halogen, nitro, methoxy, and additional phenyl groups, is suitable. Halogens are preferred, and chlorine, bromine, fluorine, trichloromethyl and trifluoromethyl are especially desired. When the arylisocyanate is mono-substituted, it is preferably free of ortho position substitutions, since ortho-chlorophenyl isocyanate generally will yield the trimer whereas meta- or para-chlorophenyl isocyanate will yield the tetramer. When the arylisocyanate reactant is poly-substituted, such as di- or tri-substituted, substituents in the ortho position do not appear to interfere with obtaining the tetramers. For example, the tetramer is produced when the reactant is 2,4-dichlorophenyl isocyanate.

Other alcohols may be employed in place of the ethyl alcohol illustrated above. Generally, alcohols containing from 1 to 16 carbon atoms are desirable; however, I prefer to use ethyl alcohol for reasons of economy and availability.

The N-methylmorpholine, illustrated as one of the catalsyts in the specific examples above, may be replaced by any tertiary amine having a sufficiently high boiling point that it will not be excessively vaporized at the reaction temperature.

In general, tertiary amines boiling above 100° C. are preferred. Desirable tertiary amines include N-methylmorpholine, N-dodecylmorpholine, pyridine, N,N-dimethylaniline, N,N-diethylaniline, N-methylpiperidine, N,N-diethylcyclohexylamine, and the like. N-methylmorpholine and other morpholines, are preferred because they are somewhat more basic than many other tertiary amines.

About 1% to 5% of alcohol and tertiary amine is used as a catalyst, based on the weight of the reactants. The tetramer polymerization reaction is exothermic and the amount of the catalysts used will vary with the nature of the arylisocyanate involved, the amount of the arylisocyanate present and the rate at which polymerization is to take place.

The most desirable temperature of the reaction can be determined in any particular instance by warming slowly until a temperature is reached at which the reaction becomes exothermic; at this temperature, heating is stopped and the reaction goes by itself. If the temperature begins to fall, heat may be supplied. On the other hand, cooling may be desirable to control the reaction, particularly if larger quantities of reactants are involved.

A recrystallization solvent is not required; but if desired, any inert solvent in which the arylisocyanates are slightly soluble may be used; such as ether, acetone, ethyl acetate and methylethyl ketone. For example, an acetone-water recrystallization solvent may be used for the crude 3,4-dichlorophenyl isocyanate tetramer, obtained in Example I above, to achieve a melting point of 273–274° C.

The compounds of the general formula:

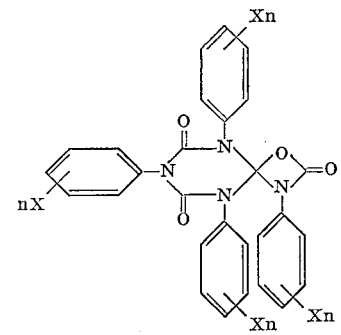

wherein X is selected from the group consisting of halogen, nitro, trichloromethyl and trifluoromethyl, $n$ is an integer from 1 to 3, and wherein further when $n$ is 1, X appears in a position on the phenyl ring selected from the group consisting of meta and para, exhibit outstanding antiseptic properties, particularly preferred compositions being in detergent formulations. Mono- and di-halogenated phenyl radicals are preferred, although further halogenation produces satisfactory compounds. In preparing such antiseptic detergents, the hereinabove described tetramers are added to the detergent, such as a water soluble soap. It is preferred that the tetramers be dissolved in a solvent; particularly preferred solvents being dimethylformamide and capric acid diethanolamide. The latter two solvents appear to enhance the bacteriostatic activity of these tetramers.

As illustrative of such bacteriostatic activity, the tetramers of 3-chlorophenyl; 4-chlorophenyl; 2,5-dichlorophenyl; and 3,4-dichlorophenyl isocyanates were compared to 3,4,4'-trichlorocarbanilide (a known bacteriostatic compound hereinafter referred to as TCC) by adding the compounds, in some cases dissolved in dimethyl formamide, to a 10% soap solution. The "soap" utilized was a neutral white toilet soap containing about 80% by weight of sodium tallow soap. The concentration of germicide in the soap solution was 1000 p.p.m. or 0.1%. Serial dilutions were then made containing 100 p.p.m. and 10 p.p.m. respectively of the various tetramers and TCC.

Aliquot amounts of the dilutions, containing concentrations of the compound ranging from 0.02 to 10 p.p.m., were thoroughly dispersed into measured amounts of sterile liquid nutrient agar. Plates were poured, allowed to solidify and streaked with a standard 4 mm. loopful of a 24-hour broth culture of Staphylococcus aureus strain FDA 209. After incubation for 24 hours at 37° C., the bacteriostatic endpoint was determined. The bacteriostatic endpoint, hereinafter called the minimum inhibitory concentration, represents the minimum concentration in p.p.m. of the compound necessary to inhibit all growth of S. aureus.

The minimum inhibitory concentrations which were found are noted in Table I.

TABLE I.—ACTIVITY OF ISOCYANATE TETRAMERS

| Compound | Melting point, ° C. | Minimum inhibitory concentration against S. aureus (p.p.m.) | |
| --- | --- | --- | --- |
| | | With Dimethyl-formamide | Without Dimethyl-formamide |
| Tetramer of N-(3-chlorophenyl)-isocyanate | 224–225 | 3 | 1–5 |
| Tetramer of N-(4-chlorophenyl)-isocyanate | 331–334 | 5 | 75 |
| Tetramer of N-(3,4-dichlorophenyl)-isocyanate | 272–273 | 0.1–0.2 | 0.4 |
| Tetramer of N-(2,5-dichlorophenyl)-isocyanate | 258–288 | 10 | (¹) |
| Tetramer of N-(3-bromophenyl)-isocyanate | 255–257 | 2 | (¹) |
| Tetramer of N-(4-chloro-3-trifluoromethylphenyl)-isocyanate | 248–250 | 0.2 | 1–5 |
| TCC | | 0.2 | (¹) |
| Soap solution alone | | 3,000 | (¹) |

¹ Not evaluated.

Relatively small amounts of these tetramers except the N-(2,5-dichlorophenyl)-isocyanate in a detergent composition such as soap will produce effective antiseptic soap compositions. I have found that amounts ranging from about 0.2% to about 5% by weight, based upon the total weight of the detergent composition, to be desirable. Lesser or greater amounts will be effective, but without substantial advantages. A preferred range is in the order of a weight concentration, in a vehicle such as soap, of about 0.5% to 3%. If the tetramer is dissolved in a solvent, concentration of the tetramer in the solvent is not critical and only that amount sufficient to get the tetramer easily into the soap formulation will be used. Generally, for convenience, 1 part of tetramer by weight will be dissolved in 100 parts by volume of either dimethylformamide or capric acid diethanolamide, i.e., 1 gram of tetramer per 100 ml. of solvent. It is preferred that the final concentration of the solvent in the soap composition be approximately the same as the tetramer concentration in the soap composition, and about 1% solvent generally is especially preferred.

The bacteriostatically active tetramers also exhibit synergistic activity with other germicides. It is preferred to add the synergistic combinations to detergent via solvent, preferably dimethyl formamide or capric acid diethanolamide to produce highly effective antiseptic detergent compositions. These two solvents appear to enhance the bacteriostatic activity of the synergistic combinations. Concentration of the total germicide combinations and the solvent in the detergent composition will remain the same as set forth hereinabove.

Synergistic activity is maintained even though the proportion, or ratio, by volume of germicides in the mixture or the concentration of the mixture in the detergent medium is varied. Illustrative thereof, Table III sets forth minimum inhibitory concentrations of varying ratios of 3,4-dichlorophenyl isocyanate tetramer and hexachlorophene in a soap solution containing 1% total germicide mixture via about 1% dimethyl formamide solvent. Table IV gives the results for a soap solution containing 1½% total germicide mixture. The results in Table III and IV are with 1% dimethyl formamide solvent.

TABLE III.—SYNERGISTIC ACTIVITY (1% GERMICIDES)

| Compounds | Ratio | Minimum inhibitory concentration against S. aureus (p.p.m.) |
|---|---|---|
| N-3,4-dichlorophenyl isocyanate tetramer/hexachlorophene | 100/0 | 0.1-0.2 |
|  | 90/10 | .07 |
|  | 80/20 | .07 |
|  | 70/30 | .06 |
|  | 60/40 | .07 |
|  | 50/50 | .07 |
|  | 40/60 | .06 |
|  | 30/70 | .08 |
|  | 20/80 | .08 |
|  | 10/90 | .2 |
|  | 0/100 | 0.3 |

TABLE IV.—SYNERGISTIC ACTIVITY (1½% GERMICIDES)

| Compounds | Ratio | Minimum inhibitory concentration against S. aureus (p.p.m.) |
|---|---|---|
| N-3,4-dichlorophenyl isocyanate tetramer/hexachlorophene | 100/0 | .1 |
|  | 90/10 | .07 |
|  | 80/20 | .06-.06 |
|  | 70/30 | .04 |
|  | 60/40 | .04-.05 |
|  | 50/50 | .04 |
|  | 40/60 | .05 |
|  | 30/70 | .07 |
|  | 20/80 | .07 |
|  | 10/90 | .1 |
|  | 0/100 | .09 |

The results obtained in the above examples, with respect to bacteriostatic activity and synergistic bacteriostatic activity in the specific soap above (20/80 sodium coco and tallow), are obtained with soaps generally. The activity exhibited by these compounds is independent of the soap vehicle, and other media may be used such as anionic and non-ionic type synthetic detergents. At the same time, soap is a system in which the compounds are highly effective. "Soap" refers to the water-soluble metallic, ammonium, or organic base salts of various fatty acids, such as lard, lauric, oleic, myristic, palmetic, stearic and the like.

TABLE II.—SYNERGISTIC ACTIVITY

| Compounds | Ratio | Minimum inhibitor concentration against S. aureus (p.p.m.) | |
|---|---|---|---|
| | | With dimethyl-formamide | Without dimethyl-formamide |
| N-3,4-dichlorophenyl isocyanate tetramer/TCC | 100/0 | 0.1-0.2 | (¹) |
|  | 50/50 | 0.08 | .2 |
|  | 0/100 | 0.2 | (¹) |
| N-3,4-dichlorophenyl isocyanate tetramer/hexachlorophene | 100/0 | 0.1-0.2 | (¹) |
|  | 50/50 | 0.07 | .2 |
|  | 0/100 | 0.3 | (¹) |
| N-3,4-dichlorophenyl isocyanate tetramer/3,4′,5-tribromosalicylanilide | 100/0 | 0.1-0.2 | (¹) |
|  | 50/50 | 0.1 | 1-2 |
|  | 0/100 | 0.7 | (¹) |

¹ Not evaluated.

I claim:
1. A compound of the formula:

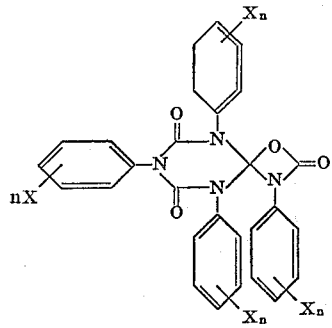

wherein X is selected from the group consisting of halogen, nitro, trichloromethyl and trifluoromethyl, $n$ is an integer from 1 to 3, and wherein further when $n$ is 1, X appears in a position selected from the group consisting of meta and para.

2. A compound of claim 1 in which X is halogen.
3. A compound of claim 1 in which X is chlorine.
4. The compound of claim 1 in which X is chlorine, $n$ is 1 and X appears in the meta position.
5. The compound of claim 1 in which X is chlorine, $n$ is 1 and X appears in the para position.
6. The compound of claim 1 in which X is chlorine, $n$ is 2 and X appears in the meta and para positions.

References Cited

UNITED STATES PATENTS 2,949,467  8/1960  Staeuble _____ 260—249.5

NORMA S. MILESTONE, Primary Examiner

JOHN M. FORD, Assistant Examiner

U.S. Cl. X.R.

252—106, 107; 260—248; 424—249